United States Patent

Takeda et al.

Patent Number: 5,296,418
Date of Patent: Mar. 22, 1994

[54] METHOD FOR MANUFACTURING A HAFNIUM-CONTAINING SILAZANE POLYMER AND A METHOD FOR MANUFACTURING A CERAMIC FROM SAID POLYMER

[75] Inventors: Yoshihumi Takeda, Niigata; Akira Hayashida, Tokyo, both of Japan

[73] Assignee: Shin-Etsu Chemical Company, Ltd., Tokyo, Japan

[21] Appl. No.: 951,571

[22] Filed: Oct. 23, 1992

Related U.S. Application Data

[63] Continuation of Ser. No. 630,063, Dec. 19, 1990, Pat. No. 5,183,875.

[30] Foreign Application Priority Data

Dec. 20, 1989 [JP] Japan .................. 1-330108

[51] Int. Cl.⁵ .............................. C04B 35/56
[52] U.S. Cl. ................................ 501/95; 501/97
[58] Field of Search ............. 501/96, 97, 98, 95; 423/353

[56] References Cited

U.S. PATENT DOCUMENTS

| | | | |
|---|---|---|---|
| 4,596,781 | 6/1986 | Carpenter | 501/94 |
| 4,668,642 | 5/1987 | Bujalski | 501/88 |
| 4,757,035 | 7/1988 | Baney et al. | 501/88 |
| 4,847,345 | 7/1989 | Takamizawa et al. | 528/35 |
| 4,886,860 | 12/1989 | Arai et al. | 525/424 |
| 5,032,551 | 7/1991 | Tashiro et al. | 501/95 |
| 5,145,812 | 9/1992 | Arai et al. | 501/97 |

*Primary Examiner*—Mark L. Bell
*Assistant Examiner*—A. Wright
*Attorney, Agent, or Firm*—McAulay Fisher Nissen Goldberg & Kiel

[57] ABSTRACT

A hafnium-containing silazane polymer is obtained through a polymerization reaction of which the reactants are
(A) a halide of an organic silicon compound;
(B) a hafnium compound having a the formula:

$$HfX_4 \qquad [I]$$

wherein X is chlorine or bromine, and
(C) a disilazane having the formula:

$$(R_2-\underset{R_3}{\overset{R_1}{Si}})_2NH \qquad [II]$$

wherein $R_1$, $R_2$ and $R_3$ may be the same or different and are hydrogen, methyl ethyl, phenyl or vinyl.

5 Claims, 3 Drawing Sheets

METHOD FOR MANUFACTURING A HAFNIUM-CONTAINING SILAZANE POLYMER AND A METHOD FOR MANUFACTURING A CERAMIC FROM SAID POLYMER

This is a continuation of application Ser. No. 07/630,063, filed Dec. 19, 1990, now U.S. Pat. No. 5,183,875.

BACKGROUND OF THE INVENTION

1. Field of the Invention

The present invention relates to a method for manufacturing a hafnium-containing silazane polymer which makes a good ceramic precursor, and a method for manufacturing a ceramic from the polymer.

2. Description of the Prior Art

Although ceramics have attracted attention because of their excellent thermal resistance, abrasion resistance, and high temperature strength, they are difficult to machine because of their hardness and brittleness. For this reason, the steps of manufacturing a ceramic article comprise: preparing a finely ground ceramic powder, compacting the powder into a desired shape, and baking it, e.g., the powder sintering method; or melting an organic polymer ceramic precursor or dissolving the precursor in a solvent, working the viscous liquid into a desired shape, and baking it to render it inorganic, i.e, the precursor method.

The main characteristic of the precursor method is that, it can provide a ceramic article having a configuration which can be produced by the powder sintering method. Therefore, the precursor method is virtually the only method that can produce fibrous ceramic articles. Among the materials generally referred to as "ceramics", SiC and $Si_3N_4$ are particularly attracting attention because reason of their superior high temperature characteristics. Thus, SiC possesses excellent heat resistance and high temperature strength, and $Si_3N_4$ exhibits excellent thermal shock resistance and fracture toughness. Consequently, research into various precursors for these ceramics materials has intensified.

The ceramics obtained through the conventionally known ceramic precursor method are mainly those based on a Si-C-O composition, a Si-O-N composition, and a Si-C-N-O composition. On the other hand, Japanese Patent Kokai No. 56-74126 discloses that a ceramic precursor based on polytitanocarbo silane containing metals, such as, Ti and Zr, can be manufactured by reacting titanoalkoxide with a polycarbo silane.

However, the ceramic obtained by baking the polytitanocarbo silane is based on a Si-Ti-O-C composition and, as such, it contains a considerable amount of oxygen. Also, such a ceramic has a tendency to quickly lose strength at temperatures above 1300° C. because it crystallizes at such temperatures. U.S. Pat. No. 4,312,970 discloses the methods for producing ceramics based on Si-C-N and Si-C-N-O compositions, respectively. However, we have found that these ceramics also undergo crystallization at temperatures above 1300° C., and thus promptly lose their strength.

Also, the ceramics obtained by the conventional ceramic precursor methods tend to have problems in workability and processability, and are low in ceramic yield.

In addition, ceramics based on $SiC-Si_3N_4$ composition, which retain the excellent properties inherent to SiC and $Si_3N_4$, such as high workability, are also known and disclosed in Japanese Patent Kokai No. 63-193930 and Japanese Patent Kokai No. 63-210133, which teach ceramic manufacturing methods which give an organic silazane polymer and a ceramic made therefrom.

SUMMARY OF THE INVENTION

We have discovered a method for manufacturing a ceramic precursor having excellent workability and processability at high ceramic yield. We have also discovered a method for manufacturing a ceramic from the inventive ceramic precursor which ceramic does not lose its strength at temperatures above 1300° C.

Moreover, we have found that ceramics based on Si-Hf-C-N or Si-Hf-C-N-O compositions obtained by ceramicizing the inventive Hf-containing silazane polymer possess superior thermal resistance as compared to the conventional ceramics made from silazane polymers.

The inventive Hf-containing silazane polymer is obtained by polymerizing the following reactants:

(A) a halide of an organic silicon compound;
(B) a hafnium compound having the formula:

$$HfX_4 \qquad [I]$$

wherein X is chlorine or bromine; and
(C) a disilazane having the formula:

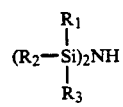
[II]

wherein $R_1$, $R_2$ and $R_3$ are hydrogen, methyl, ethyl, phenyl or vinyl, and may be the same or different from each other;

The inventive ceramic is obtained by fusing, shaping, infusibilizing and baking the inventive Hf-containing silazane polymer. We have further discovered a ceramic based on a Si-Hf-C-N composition or a Si-Hf-C-N-O composition having a high ceramic yield, a high strength and a high elastic modulus, which maintains high strength and elasticity at temperatures of about 1400° C.

DETAILED DESCRIPTION OF THE INVENTION

Figure 1:
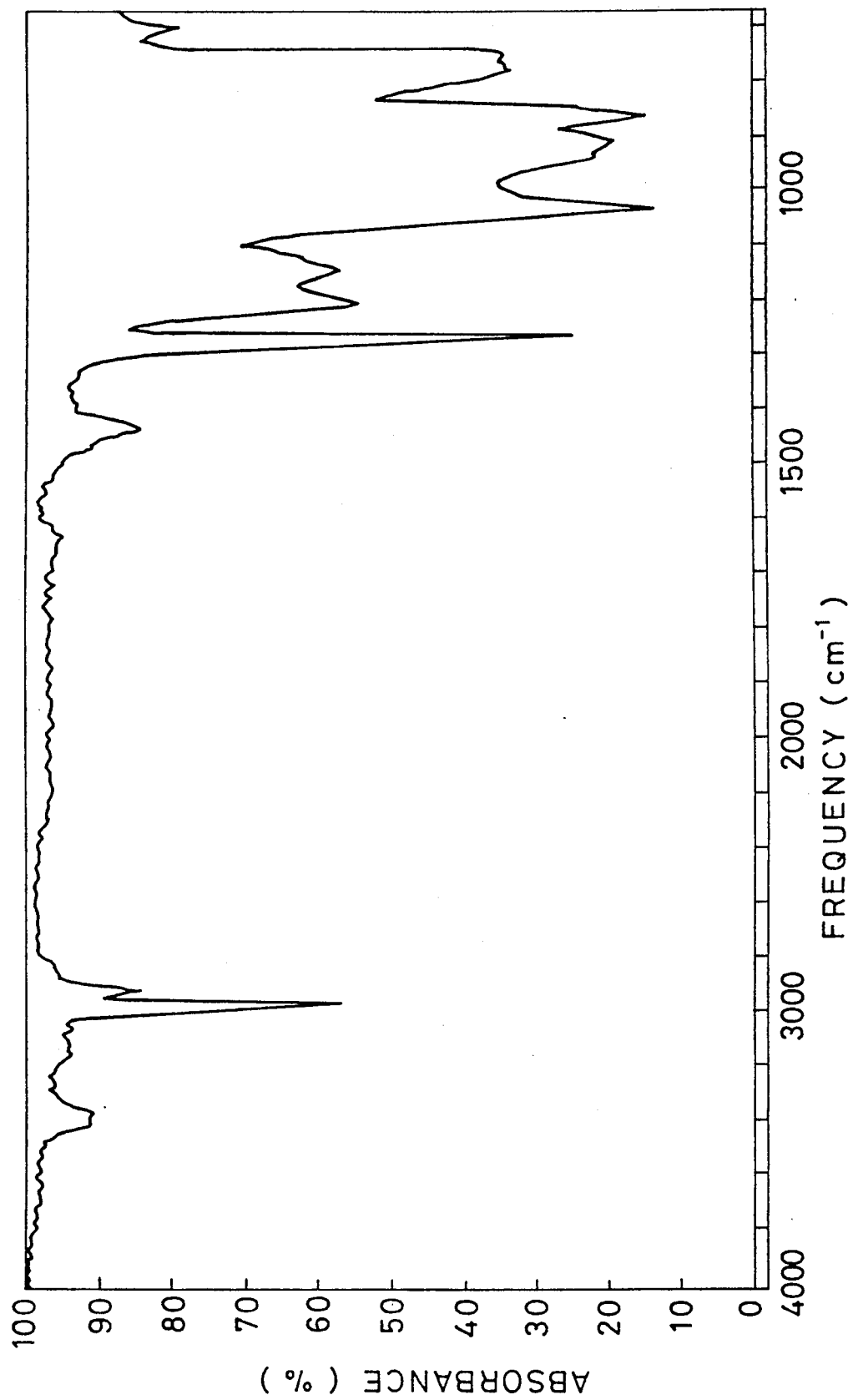
FIG. 1 is an IR absorption spectrum of the hafnium-containing silazane polymer obtained in Example 1.

In the method for manufacturing the hafnium-containing polycarbo silazane polymer of the invention, the starting material should be a mixture of a halide of an organic silicon compound and a hafnium compound having the general formula [I].

A preferable halide of an organic silicon compound has the formula:

[III]

wherein R4 and R5 are hydrogen, chlorine, bromine, methyl, ethyl, phenyl or vinyl, and may be the some or different from each other; and X is chlorine or bromine.

Also, preferred is a compound having the formula:

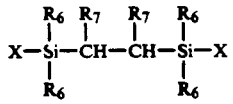

wherein $R_6$ is hydrogen, chlorine, bromine, methyl, ethyl, phenyl or vinyl, $R_7$ is hydrogen or methyl, and X is chlorine or bromine.

These and other halides can be used alone or in combination. However, if the halide of formula [IV] is used, or a mixture of halides [III] and [IV] is used, the resulting hafnium-containing silazane polymer produces, upon melt-spinning, a green thread which has a higher tensile strength and flexibility than the conventionally obtainable green threads. This novel green thread exhibits minimal breakage and can be handled easily and facilitates a smooth spinning operation. Therefore, the green thread of the invention is superior in workability and processability.

Some of the examples of the compound represented by formula [III] are $H_2SiCl_2$, $HSiCl_3$, $SiCl_4$, $CH_3SiCl_3$, $(CH_3)SiCl_2$, $(C_2H_5)SiCl_3$, $(C_2H_5)SiCl_2$, $C_6H_5SiCl_3$, $(C_6H_5)_2SiCl_2$, $CH_2=CHSiCl_3$, and $(CH_2-CH)_2SiCl_2$, $(CH_2=CH)(CH_3)SiCl_2$.

The examples of the compound represented by formula [IV] include:
$ClH_2SiCH_2CH_2SiH_2Cl$
$ClN_2HSiCH_2CH_2SiHCl_2$
$Cl_3SiCH_2CH_2SiCl_3$
$Cl(CH_3)_2SiCH_2CH_2Si(CH_3)_2Cl$
$Cl_2(CH_3)SiCH_2CH_2Si(CH_3)Cl_2$
$Cl(CH_3)_2SiCH_2(CH_3)CH(CH_3)Si(CH_3)_2Cl$
$Cl_2(CH_2=CH)SiCH_2CH_2Si(CH=CH_2)Cl_2$.

Of these, 1,2-bis(chlorodimethylsillyl)ethane, 1,2bis(-dichloromethylsillyl)ethane, and 1,2bis(trichlorosillyl)ethane are preferred.

We have further discovered that the novel Hf-containing silazane polymer is more effectively obtained if the halide, hafnium compound ad disilazane are maintained in a water-free atmosphere and reacted at a temperature between about 25 and 350° C., and the volatile by-product is removed from the reaction system by distillation.

In the inventive manufacturing method, if a mixture of the compound represented by formulas [III] and [IV] is used, the mixing ratio of [III]:[IV] in molar percent is preferably in the range from 90:10 to 60:40. When the amount of compound [IV] is less than 10 molar %, the resulting silazane polymer will have poor strength and flexibility. For example, the green thread obtained by spinning such a silazane polymer after fusing, breaks easily on winding or subsequent processing. As a result, the overall ceramic yield becomes low, and the physical properties, such as, the strength of the final product is poor.

On the other hand, if the amount of compound [IV] is greater than 40 molar %, a considerable amount of free carbon is created when the resulting hafnium-containing silazane is ceramicized, resulting in the ceramic having poor resistance to oxidation.

The hafnium compound represented by formula [I] can be $HfCl_4$, $HfBr_4$, and the like.

Also, in the present invention, it is preferable that a mixture of halides [III], [IV] and a hafnium compound (hereinafter referred to as "mixture [M])") is used as the starting material. A preferred mixing ratio of the hafnium compound to the total amount of the halides of organic silicon compounds [III] and [IV] is about 0.01-10 molar %, or more preferably 0.05-5 molar %, and most preferably 0.1-3 molar %. If the ratio of the hafnium compound exceeds 10 molar %, an insoluble hafnium compound is formed and only insubstantial amounts of hafnium can enter the polymer. As a result, the polymer retains a considerable amount of unreacted chlorine which renders the polymer thermally instable. On the other hand, if the ratio of the hafnium compound is less than 0.01 molar %, the heat resistance of the ceramicized material can be low.

It is preferable if the mixture [M] is used in the reaction with the disilazane of formula [II]. Theoretically, the dosage of the disilazane of formula [II] can be such that its mol number is ½ of the mol number of the chlorine contained in mixture [M]. However, in practice it is recommended that the dosage of the disilazane be 0.7-1.2, and preferably, 0.8-1.1 times as much as said chlorine in mol number.

Examples of the disilazane compound represented by formula [II] are $(H_3Si)_2NH$, $[H_2(CH_3)Si]_2NH$, $[H(CH_3)_2Si]_2NH$, $[(CH_3)_3Si]_2NH$, $[(C_2H_5)_3Si]_2NH$, $[C_6H_5)_3Si]_2NH$, $(CH_2-CH(CH_3)_2Si]_2NH$, $[CH_2=CH(C_6H_5)_2Si]_2NH$, and $(CH_2=CH(C_2H_5)_2Si]_2NH$. These and other disilazane compounds can be used alone or in combination.

When the mixture [M] is reacted with a disilazane [II], mixture [M] and disilazane [II] can be dissolved in a solvent to undergo the reaction, but it is economically preferable to effect the reaction without the use of a solvent. The reaction is effectively conducted in a water-free atmosphere at a reaction temperature of about 25-350° C., and preferably, 150-350° C. If the reaction temperature is lower than 25° C., the reaction does not proceed, and if it is higher than 350° C., the reaction rate gets so high that it becomes difficult to control the polymerization degree and an insoluble and infusible polymer is produced. In order to obtain a precursor for a ceramic fiber, the reaction should be conducted at about 150 to 350° C. for a period of 0.5 hour to 5 hours, preferably from 1 to 3 hours.

After the completion of the reaction as specified above, the by-product volatile element is removed from the reaction system by distillation, and as a result, a hafnium-containing silazane polymer can be obtained in forms varying from an oily fluid to a hard solid.

It is believed that mixture [M] when reacted with the disilazane, proceeds through reactions A and B as follows:

Reaction Series A

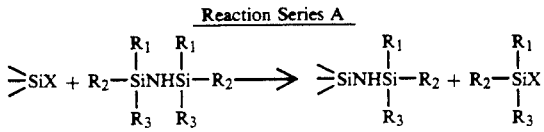

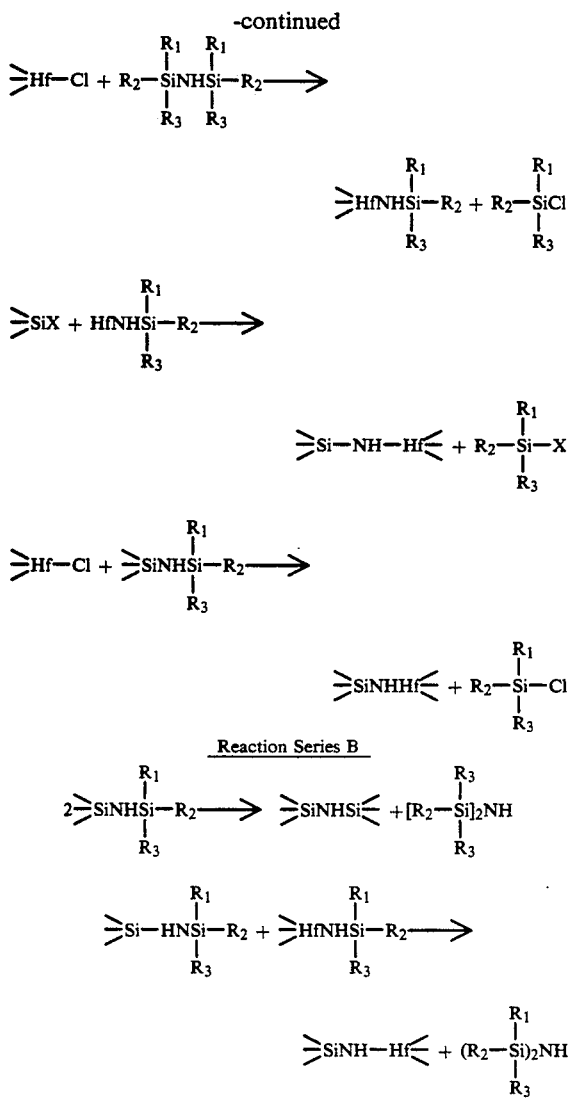

hafnium-containing polycarbosilazane.

Therefore, at first, it is thought the reactions of Series A take place, and then as the temperature rises, the condensation reactions of Series B take place. As a result, the hafnium-containing silazane polymer having the high molecular weight in the desired range is obtained.

The low molecular by-products produced are distilled from the reaction system through an atmospheric or vacuum distillation conducted during the progress of the reactions, and these by-products can be recycled.

It is possible to control the polymerization degree and the melting point of the hafnium-containing silazane polymer through modification of the mix proportion of the organic silicon compound, the reaction temperature, reaction time, etc. Furthermore, it is possible to adjust the mean molecular weight and the melting point of the final polymer product by vacuum distillation of the hot polymer to strip off the oligomers having relatively low molecular weights.

The thus obtained hafnium-containing silazane polymer possesses excellent moldability and workability, and is suitable for shaping into various forms, and particularly into fibers and sheets. The polymer may also be used as a binder or adhesive.

The ceramic manufacturing method according to the present invention comprises the steps of fusing or melting the abovementioned hafnium-containing silazane polymer, shaping it, infusibilizing it, and baking it. It is preferred, if the polymer used in this method has a melting point of 60-250° C. and a molecular weight of 800-5000 (measured by the benzene cryoscoping depressant method).

It is possible to fuse and mold the hafnium-containing silazane polymer as it is produced. However, it is preferable to dissolve the silazane polymer in an organic solvent such as hexane, benzene, toluene and tetrahydrofuran, and remove the insolubles by filtration. The solvent is stripped by a vacuum distillation, or the melt of the silazane polymer is filtered as is, while hot, to remove the insolubles. By such a treatment, it is possible to remove insoluble impurities from the polymer, and to thereby attain high strength and stable quality in the resulting ceramics.

The manner of melting, shaping, infusibilizing, and baking the hafnium-containing silazane polymer is not critical, and conventional procedures may be used to melt the polymer, mold it into any desired shape, infusibilize it, bake it, and eventually, obtain ceramic articles of various forms.

For instance, when a ceramic fiber is desired, the hafnium-containing silazane polymer is first heated to form a melt and then spun by a melt spinning method. The spinning temperature is determined depending on the melting point of the polymer, and is preferably in the range from 100 to 300° C.

Infusibilization of molded polymer can be achieved by heating it in the air, the heating temperature preferably being from 50-250° C. If the temperature is lower than 50° C., no infusibilization takes place, and if higher than 250° C., the polymer will be fused and/or a considerable amount of oxygen enters into the ceramic producing poor strength.

The present inventors have proposed an alternative infusibilization method in U.S. patent application Ser. No. 371,716. According to this proposal, a silazane polymer is infusibilized by first treating it with a gas containing the vapor of one or more silicon compounds represented by formula [V]:

$$R'_aSiZ_{4-1} \qquad [V]$$ 

wherein R' is hydrogen; lower alkyl, alkenyl, or aryl, and Z is chlorine, bromine, or iodine; a is an integer of 0 to 2, and if a is 2, R' can be homogeneous or heterogeneous. Thereafter, the polymer is treated with a water-containing or ammonia-containing gas.

More specifically, the above application discloses infusibilizing a silazane polymer, in the form of a green thread obtained from the above-disclosed melt spinning method by treating the thread with an infusibilizing agent comprising a silicon compound of formula [V] in gaseous form. Thereafter, the thread is treated with water-containing or ammonia-containing gas.

Examples of the infusibilizing agent include: $CH_3SiClN_3$, $(CH_3)_2SiCl_2$, $(C_2H_5)SiHCl_2$, $(C_6H_5)_2SiCl_2$, $C_6H_5SiCl_3$, $(C_6H_5)_3SiCl$, $CH_2\!\!=\!\!CHSiCl_3$, $(CH_2\!\!=\!\!CH)_2SiCl_2$, $HSiCl_3$, $H_2SiCl_2$, $SiCl_4$, $H(CH_3)SiCl_2$, $H(CH_2\!\!=\!\!CH)SiCl_2$, and $(CH_2\!\!=\!\!CH)C_6H_5SiCl_2$. Of these, $HSiCl_3$ and $SiCl_4$ are preferred.

The manner of treating the silazane polymer article with an infusibilizing agent(s) is not critical. For example, an inert gas such as N2 and Ar may be used as a carrier gas. The carrier gas is passed into the infusibilizing agent and then into contact with the silazane polymer article. The concentration of the infusibilizing agent in the carrier gas may be controlled to a desired level by adjusting the temperature of the infusibilizing agent source so as to give an appropriate vapor pressure. If the concentration of the agent in the gas is too high, the gas may be diluted with an inert gas. In general, the concentration of infusibilizing agent vapor is preferably controlled to 0.001 to 0.1 mol of the agent per liter of the carrier gas. The optimum treating temperature and time vary with the particular type of hafnium-containing silazane polymer used. Usually, the treating temperature is sufficiently low to maintain the polymer infusible, that is, a temperature sufficiently lower than the melting point of the polymer. The treatment is carried out for a time period sufficient to render the articles substantially infusible (normally about 5 to 240 minutes).

At the end of the first infusibilizing step, the polymer articles become insoluble in commonly used solvents, for example, benzene, hexane, toluene, and tetrahydrofuran. However, the polymer article resulting from only the first infusibilizing step is not fully infusible and will fuse during subsequent pyrolysis. Therefore, the second step of treating with water-containing or ammonia-containing gas is essential to enhanced the infusibility of the polymer article.

The manner of treatment in the second step is not particularly critical either. In treating with a water—containing gas, for example, the articles resulting from the first infusibilizing step may simply be exposed in the water-containing gas for a predetermined time to render the article completely infusible. Exposure to air is simple, but makes it somewhat difficult to consistently yield ceramic articles having a high strength and modulus because the humidity in the air is not always constant. Due to varying humidity, subsequent baking may produce a ceramic article having a varying oxygen content, or merged fibers. Therefore, the second step is preferably carried out by passing air or an inert gas, such as, $N_2$ and Ar into water at a controlled temperature. More preferably, it is effected by bubbling air or an inert gas through water at a predetermined rate, thereby saturating the gas with the water vapor at the given temperature. The resulting gas with saturated water vapor is passed over the articles for a sufficient time to complete infusibilization. The temperature of the water into which air or inert gas is bubbled may vary over the range of 0 to 100° C., more preferably 0 to 70° C., or still more preferably, 0 to 30° C.

If ammonia is used, it is also preferable to control the concentration of ammonia to an adequate range, for example, 0.01 to 100 volume %, preferably 0.2 to 50 volume %, or still more preferably, 0.5 to 10 volume %. If the concentration of ammonia in the gas is too high, the ammonia may be diluted with an inert gas, such as, Ar and He or $N_2$ gas, and the diluted ammonia gas passed over the articles for a sufficient time to complete infusibilization, Like the first step, the optimum treating temperature and time vary with the particular type of hafnium-containing silazane polymer used. Usually, the treating temperature is a temperature sufficiently lower than the melting point of the polymer to avoid melting of the polymer. The treating time is sufficient to render the articles substantially infusible (normally about 5 to 240 minutes).

The polymeric articles thus made infusible, such as an infusibilized thread article, are then baked at high temperatures under tension or in free state, in a conventional manner. As a result, ceramic articles based on a Si-Hf-C-N composition having excellent strength modulus, heat resistance and oxidation resistance are obtained. This baking is preferably carried out in a vacuum or an inert gas, such as, argon or in an atmosphere of $N_2$ gas, $H_2$ gas, or $NH_3$ gas, or mixtures thereof at a temperature of about 700 to 2000° C., preferably 700 to 1500° C. Also, it is preferred to bake infusibilized precursor fibers under tension. Under such preferred conditions, it is possible to obtain ceramic fibers having a tensile strength of 200 to 300 kg/mm2 and a modulus of elasticity of 14 to 25 t/mm2.

Also, if this hafnium-containing silazane polymer is added as a binder to a powder of ceramic starting material, such as, alumina, silicon carbide, silicon nitride, boron nitride, and mixtures thereof, it is possible to easily obtain a high quality ceramic compact by baking the powder. In the preparation of this ceramic powder, it is preferable to dose the hafnium-containing silazane polymer in an amount of 2-10 weight parts, and preferably, 3-5 weight parts, per 100 weight parts of the ceramic starting material. In this procedure, if the mixture compact of the starting powder and the additive hafnium-containing silazane polymer does not undergo deformation during the later baking step, it is not necessary to infusibilize the compact.

With the inventive method, it is possible to manufacture the hafnium-containing silazane polymer in an industrially advantageous manner and obtain a silazane polymer which exhibits excellent workability and processability, and which is easy to handle because of its high strength and flexibility. What is more, since the silazane polymer is ceramicized at a high ceramic yield, it makes a desirous ceramic precursor, especially for the manufacture of fibrous ceramics.

With the inventive method for manufacturing ceramics, the hafnium-containing silazane polymer can be easily molded into desired shapes, such as, fibers and sheets. By subsequent baking, high quality ceramics based on a Si-Hf-C-N composition or a Si-Hf-C-N-O composition at a high ceramic yield, having high strength, high modulus, and excellent heat resistance and oxidation resistance, are obtained.

Examples of the present invention are given below together with comparative examples by way of illustration and not by way of limitation.

EXAMPLE 1

Polymerization Step

A dried 500-milliliter four-necked flask equipped with a stirrer, a thermometer, a gas inlet tube, a dropping funnel, and a condenser was charged with 12.8 g (0.05 mol) of 1,2-bis (methyldichlorosilyl)ethane, 62.3 g (0.45 mol) of methyltrichlorosilane, and 0.8 g ($2.5 \times 10^{-3}$ mol) of $HfCl_4$. Then, 266 g (1.65 mol) of $[(CH_3)_3Si]_2NH$ were dripped into the flask by means of the dropping funnel. The mixture was gradually heated in an $N_2$ atmosphere (reflux started when the flask temperature reached 90° C. and the vapor temperature was 58° C.); the reaction temperature was thus raised up to 300° C., while the more volatile components (trimethylchlorosilane and hexamethyldisilazane) evaporated and escaped from the flask, and when the temperature reached 300° C., it was maintained thereat for four hours. The reaction product was cooled to room temperature, and 100 ml of dehydrated hexane were added to dissolve the reaction product; the insoluble matter was removed by filtration, and the filtrate was stripped of the hexane and lower molecular material under a reduced pressure of 10 mmHg at 250° C. The residue was a yellowish brown glasslike solid and weighed 38 g. The molecular weight of this substance was 1883 (measured by the benzene cryoscoping depressant method, as are all the molecular weight data hereinafter given); the melting point was 160° C. FIG. 1 is an IR absorption spectrum taken of the silazane polymer thus obtained. The spectrum indicates that the absorption was caused at 3400 cm$^{-1}$ by NH, at 2980 cm$^{-1}$ by CH and at 1260 cm$^{-1}$ by SiCH$_3$.

Fiber Preparation Step

Ten grams of the silazane polymer obtained in the polymerization step were melt-spun at 210° C. by the use of a mono-hole melt spinning apparatus having a thin hole of 0.5 mm diameter. The spinning operation went smoothly at a take-up speed of 250 m/min. Then, the resultant green thread infusibilized in air while the temperature was raised from 100° C. to 220° C. (at a rate of 10° C./hr).

Figure 2:
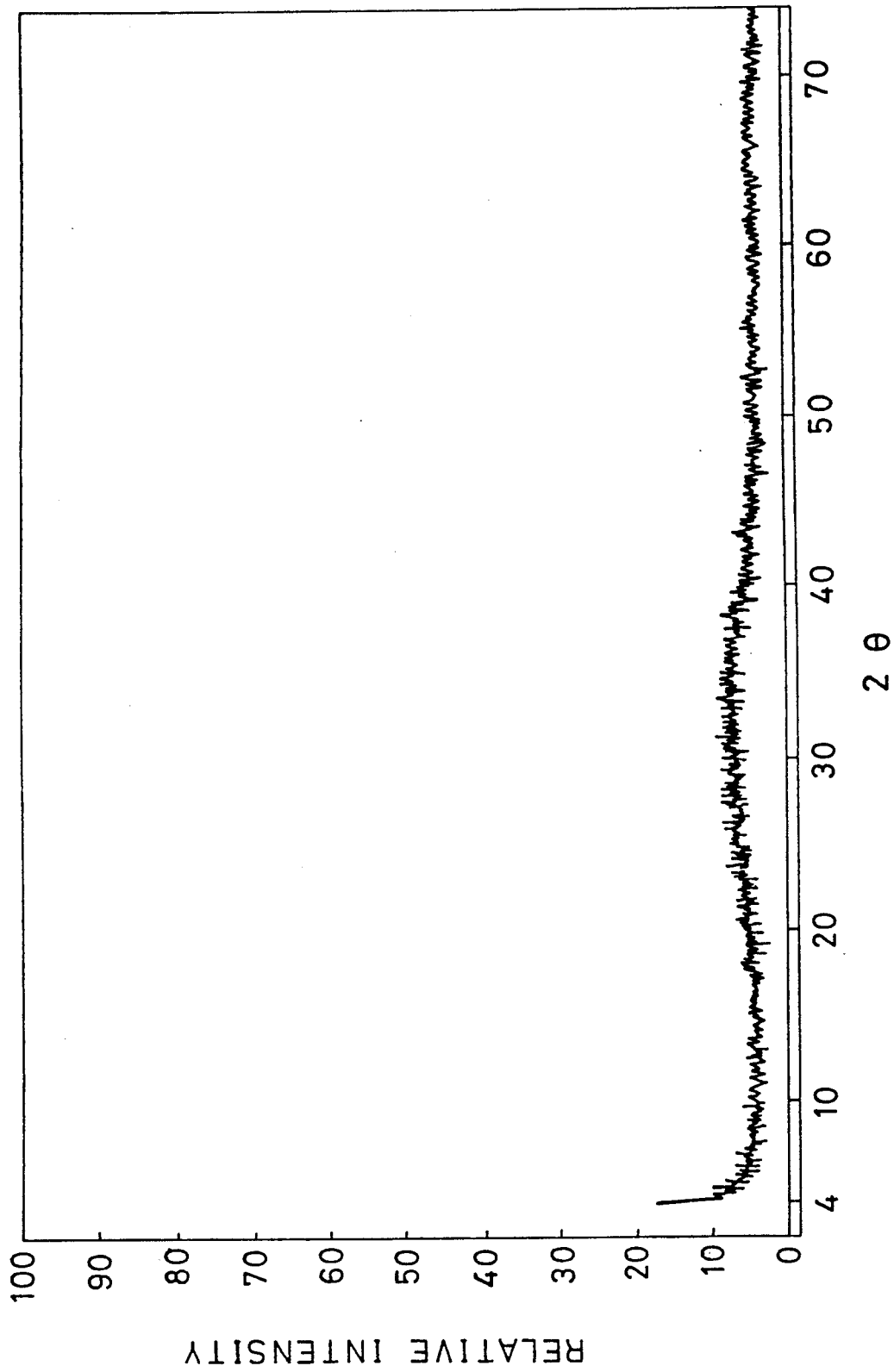
FIG. 2 is an X-ray diffraction pattern of a ceramic obtained from the polymer of Example 1.

Thereafter, while maintained under slight stretching, the infusibilized thread was baked in an N$_2$ gas stream for 30 minutes at a temperature of 1400° C., to which the temperature was raised at a rate of 200° C./hr. The ceramic yield was 70%, and the resulting fibrous substance had a fiber diameter of 1.3 μ, a tensile strength of 195 kg/mm$^2$ and a modulus of 14.5 t/mm$^2$. Analysis confirmed the composition to comprise 54% of Si, 13.5% of C, 20.8% of N, 10.2% of O, and 1.5% of Hf. FIG. 2 is an X-ray diffraction pattern taken of this fiber. The ceramic thus obtained was found "noncrystalline." (Since polymers never consist of a single molecular species, a polymer cannot be a crystal in exactly the same way as a pure compound in which the molecules pack in a perfectly ordered way. However, some polymers have many of the physical characteristics of crystals and are said to be "crystalline." The polymers are noncrystalline when spun into thread, but crystallization can be induced by slow stretching.)

EXAMPLE 2

Polymerization Step

Unless otherwise specified, the procedure was the same as in Example 1. A dried 500-milliliter four-necked flask was charged with 25.6 g (0.1 mol) of 1,2-bis(methyldichlorosilyl)ethane, 59.8 g (0.4 mol) of methyltrichlorosilane, and 1.6 g (0.005 mol) Of HfCl$_4$. Then, 261 g (1.62 mol) of [(CH$_3$)$_3$Si]$_2$NH were dripped into the flask by means of the dropping funnel. The mixture was heated at 300° C. and reacted for three hours. The reaction product was cooled to room temperature, and treated as in Example 1. A yellowish brown solid was obtained in an amount of 45 g. The molecular weight of this substance was 2361 and the melting point was 167° C.

Fiber Preparation Step

Ten grams of the silazane polymer obtained in the polymerization step of Example 2 were melt-spun at 215° C. using the same mono-hole melt spinning apparatus used in Example 1. Then, the resultant green thread was suspended in a mullite tube furnace having a dimension of 50 mm (inner dia.)×1 m (height), and the furnace temperature was adjusted to 40° C. The green thread was treated with trichlorosilane gas (gas concentration: 0.7 vol %) for thirty minutes; then, the thread was treated with gaseous ammonia (gas concentration: 6 vol %) for thirty minutes whereby it was infusibilized. The atmosphere in the mullite tube furnace was then replaced with an N$_2$ gas, and the green thread was baked at a temperature of 1300° C. (temperature rise rate: 240° C./hr) in an N$_2$ stream for thirty minutes. As a result, a black, glossy fiber was obtained. The ceramic yield was 72% and the fiber obtained had a fiber diameter of 12 μ, a tensile strength of 243 kg/mm$^2$, and an elastic modulus of 18.5 t/mm$^2$.

Thereafter, this fiber was again subjected to a similar infusibilization step, and a 30-minute-long baking at 1400° C. The fiber obtained had a diameter of 12 μ, a tensile strength of 247 kg/mm$^2$, and an elastic modulus 19 t/mm$^2$. Thus, only minimal degradation in physical properties was observed. The X-ray diffraction pattern of this fiber showed that the fiber was noncrystalline, as it was when first baked at 1300° C. Elemental analysis confirmed the composition to be Si-Hf-C-N-O comprising 59.7% of Si, 11.7% of C, 25.6 of N, and 2.99% of Hf.

EXAMPLE 3

Polymerization Step

As in Example 1, a dried 500-milliliter four-necked flask of the same make was charged with 51.2 g (0.2 mol) of 1,2-bis(methyldichlorosilyl)ethane, 44.9 g (0.3 mol) of methyltrichlorosilane, and 8.01 g (0.025 mol) of HfCl$_4$. Then, 290 g (1.6 mol) of [(CH$_3$)$_3$Si]$_2$NH were dripped into the flask as in Example 1. The mixture was heated at 310° C. and reacted for 1.5 hours. As a result, a blackish brown solid was obtained in an amount of 48 g. The molecular weight of this substance was 4500 and the melting point was 227° C.

Fiber Preparation Step

Ten grams of the polymer obtained in the polymerization step of Example 3 were melt-spun at 280° C. by the use of the same mono-hole melt spinning apparatus used in Example 1. The resultant green thread was infusibilized with trichlorosilane gas and gaseous ammonia in the same manner as in Example 2, and the thread was baked at a temperature of 1400° C. in an N$_2$ stream for thirty minutes.

The ceramic yield was 75%, and the fiber obtained had a diameter of 10 μ, a tensile strength of 235 kg/mm$^2$, and an elastic modulus of 17 t/mm$^2$. Elemental analysis confirmed the ceramic to have an Si-Hf-C-N composition comprising 53.6% of Si, 12.5% of C, 23.5% of N, and 10.36% of Hf. The X-ray diffraction pattern indicated that the ceramic was noncrystalline,

EXAMPLE 4

Polymerization step

As in Example 1, a dried 500-milliliter four-necked flask of the same make was charged with 12.8 g (0.05 mol) of 1,2-bis(methyldichlorosilyl)ethane, 67.2 g (0.45 mol) of methyltrichlorosilane, and 4.8 g (0.015 mol) of HfCl$_4$. Then, 259 g (1.61 mol) of [(CH$_3$)$_3$Si]$_2$NH was dripped into the flask as in Example 1. The mixture was heated at 300° C. and reacted for 2 hours. As a result, a yellowish brown solid was obtained in an amount of 43.5 g. The molecular weight of this substance was 2850 and the melting point was 175° C.

Fiber Preparation Step

Fifteen grams of the polymer obtained in the polymerization step of Example 4 were melt-spun in the same manner as in Example 1. Then, the resultant green thread was infusibilized with trichlorosilane gas and gaseous ammonia in the same manner as in Example 2. Samples of the thread were baked, respectively, at temperatures of 1200° C., 1300° C., 1400° C., 1500° C., and 1600° C. for thirty minutes in an $N_2$ stream. The physical properties of the resulting fibers are given in Table 1 below.

TABLE 1

| Baked for 30 min. at | fiber dia. ($\mu$) | tensile strength (kg/mm2) | modulus of elasticity (t/mm2) |
|---|---|---|---|
| 1200° C. | 12 | 250 | 18 |
| 1300° C. | 12 | 240 | 18.5 |
| 1400° C. | 12 | 245 | 18 |
| 1500° C. | 12 | 200 | 15 |
| 1600° C. | 12 | 100 | 12 |

Table 1 shows that the tensile strength did not deteriorate up to the baking temperature of 1400° C. X-ray diffraction showed that the ceramic was noncrystalline up to a baking temperature of 1400° C. When the polymer was baked at a temperature higher than 1400° C., crystallization could occur. When the polymer was baked at a temperature at 1600° C., the diffraction peaks observed indicated the existences of $Si_3N_4$, SiC, HfN, HfC, etc.

EXAMPLE 5

Polymerization Step

As in Example 1, a dried 500-milliliter four-necked flask of the same make was charged with 74.8 g (0.5 mol) of methyltrichlorosilane and 1.6 g (0.005 mol) of $HfCl_4$. Then, 244.7 g (1.52 mol) of $[(CH_3)_3Si]_2NH$ were dripped into the flask as in Example 1. The mixture was heated at 320° C. and reacted for 2 hours. As a result, a yellowish brown solid was obtained in an amount of 42 g. The molecular weight of this substance was 1800 and the melting point was 138° C.

Fiber Preparation Step

Fifteen grams of the polymer obtained in the polymerization step of Example 5 were melt-spun in the same manner as in Example 1. The resultant green thread was infusibilized with trichlorosilane gas and gaseous ammonia in the same manner as in Example 2. The thread was then baked at a temperature of 1400° C. for thirty minutes in an $N_2$ stream.

The ceramic yield was 67%, and the fiber obtained had a diameter of 14 $\mu$, a tensile strength of 220 kg/mm², and an elastic modulus of 16.5 t/mm². The ceramic was confirmed to contain 28.5% of Hf and the X-ray diffraction pattern indicated that the ceramic was noncrystalline.

COMPARATIVE EXAMPLE 1

Polymerization step

A dried 500-milliliter four-necked flask equipped with a stirrer, a thermometer, a gas inlet tube, a dropping funnel, and a condenser was charged with 74.8 g (0.5 mol) of methyltrichlorosilane. Then, 241 g (1.5 mol) of $[(CH_3)_3Si]_2NH$ were dripped into the flask by means of the dropping funnel. The mixture was gradually heated in an $N_2$ atmosphere. Reflux started when the flask temperature reached 67° C. and the vapor temperature was 59° C. The reaction temperature was thus raised up to 310° C., while the more volatile components (trimethylchlorosilane and hexamethyldisilane) evaporated and escaped from the flask. When the temperature reached 310° C., it was maintained thereat for 3.5 hours. The reaction product was cooled to room temperature, and 150 ml of dehydrated hexane were added to dissolve the reaction product. The insoluble matter was removed by filtration, and the filtrate was stripped of the hexane and lower molecular matter under a reduced pressure of 10 mmhg at 250° C. The residue was a transparent solid and weighed 31 g. The molecular weight of this substance was 1926 and the melting point was 178° C. The IR absorption spectrum of the solid indicated that the absorption was caused at 3400 cm$^{-1}$ by NH, at 2980 cm$^{-1}$ by CH and at 1250 cm$^{-1}$ by $SiCH_3$.

Fiber Preparation Step

The polymer obtained in the polymerization step was melt-spun at 230° C. using the same mono-hole melt spinning apparatus used in the fiber preparation step of Example 1. However, the spinning operation went poorly. The green thread was very brittle and it broke frequently during the spinning operation. The tensile strength of the thread was 500 g/mm², which was 1/14 of that of the green thread obtained in Example 1. Then, the resultant green thread was infusibilized with trichlorosilane and gaseous ammonia in the same manner and under the same conditions as employed in the fiber preparation step of Example 2. Thereafter, while under slight streching, the infusibilized thread was baked in an $N_2$ gas stream for 30 minutes at respective temperatures of 1200° C., 1300° C., 1350° C., 1400° C., and 1500° C., to which the temperature was raised at a rate of 200° C./hr. The physical properties of the resulting fibers are given in Table 2 below.

TABLE 2

| Baked for 30 min. at | fiber dia. ($\mu$) | tensile strength (kg/mm2) | modulus of elasticity (t/mm2) |
|---|---|---|---|
| 1200° C. | 12 | 170 | 14 |
| 1300° C. | 12 | 120 | 13 |
| 1350° C. | 12 | 100 | 12 |
| 1400° C. | 12 | 50 | 11 |
| 1500° C. | 12 | 50 | 11 |

Figure 3:
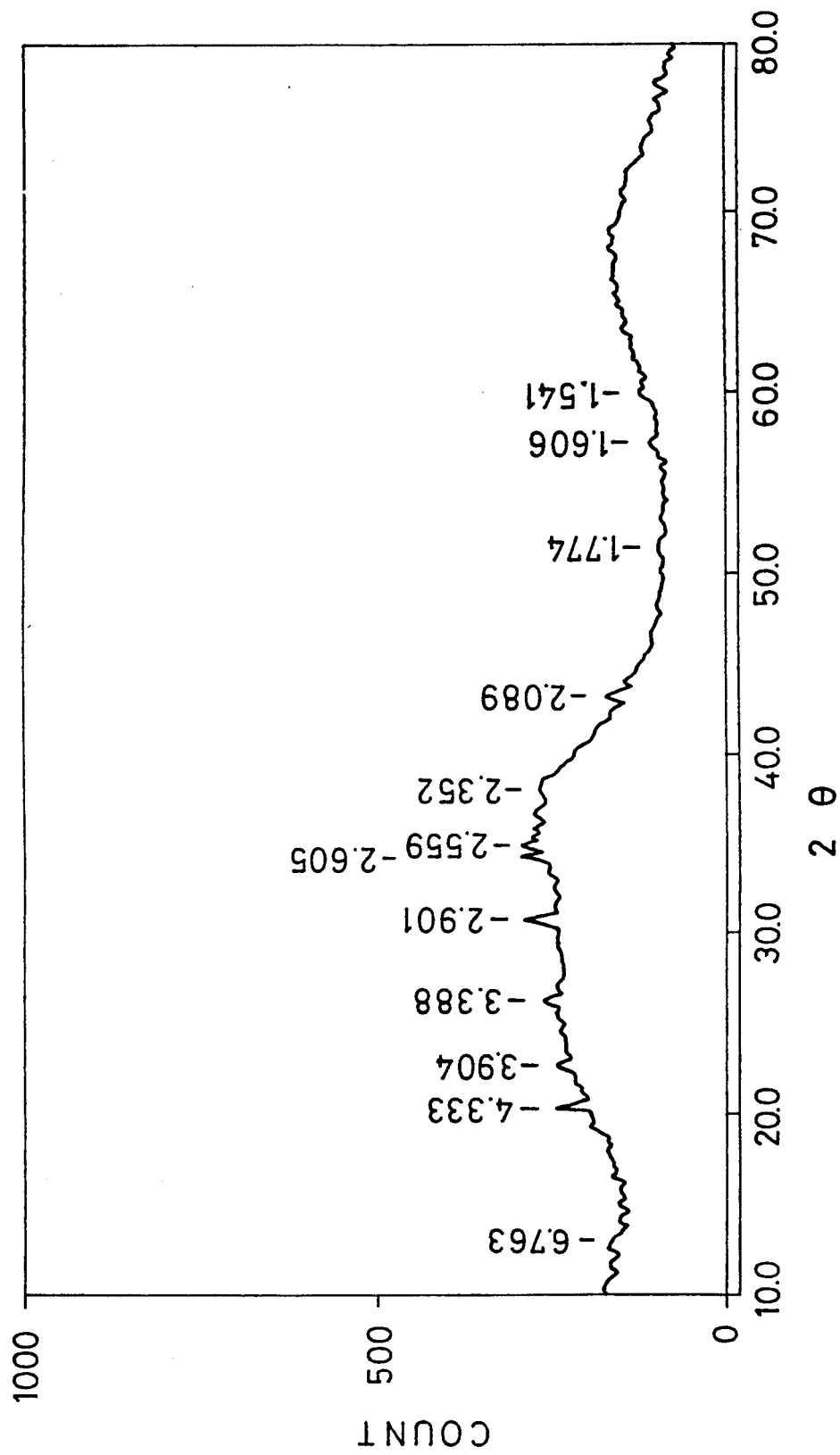
FIG. 3 is an X-ray diffraction pattern of a ceramic obtained in the Comparative Example.

Table 2 tells that the tensile strength modulus of elasticity of the fiber baked at 1200° C. were far poorer than those of the counterpart fiber in Table 1, and the tensile strength deteriorated sharply when the baking temperature was 1400° C. or higher. X-ray diffraction showed the ceramic to be noncrystalline up to a baking temperature of 1200° C. When the polymer was baked at a temperature at 1300° C., the diffraction peaks were already observed. At 1400° C., diffraction was clearly observed which indicated the existence of $Si_3N_4$. FIG. 3 shows the X-ray diffraction pattern.

What is claimed is:

1. In a method for forming a shaped ceramic article wherein a silazane polymer is fused, shaped, infusibilized, and baked, the improvement which comprises said polymer being a hafnium-containing silazane polymer obtained by reacting, under conditions to effect polymerization in a water-free atmosphere and at a temperature between about 25° C. and 350° C., a mixture of
(A) a halide of an organic silicon compound selected from the group consisting of:

$$\begin{array}{c} R_4 \\ | \\ X-Si-X \\ | \\ R_5 \end{array} \qquad [III]$$

wherein $R_4$ and $R_5$ may be the same or different and are hydrogen, chlorine, bromine, methyl, ethyl, phenyl or vinyl and X is chlorine or bromine;

a compound having the formula:

$$\begin{array}{c} R_6\ R_7\ \ R_7\ R_6 \\ |\ \ |\ \ \ |\ \ | \\ X-Si-CH-CH-Si-X \\ |\ \ \ \ \ \ \ \ \ \ \ \ \ \ | \\ R_6\ \ \ \ \ \ \ \ \ \ R_6 \end{array} \qquad [IV]$$

wherein $R_6$ is hydrogen, chlorine, bromine, methyl, ethyl, phenyl or vinyl, $R_7$ is hydrogen or methyl, and X is chlorine or bromine;

and mixtures thereof;

(B) a hafnium compound having the formula:

$$HfX_4 \qquad [I]$$

wherein X is chlorine or bromine; and
(C) a disilazane having the formula $$\begin{array}{c} R_1 \\ | \\ (R_2-Si)_2NH \\ | \\ R_3 \end{array} \qquad [II]$$

wherein $R_1$, $R_2$ and $R_3$ may be the same or different and are hydrogen, methyl ethyl, phenyl or vinyl.

2. The method of claim 1 wherein a mixture of compounds [III] and [IV] is used, the molar percent ratio of compound [III]:[IV] being in the range from about 90:10 to 60:40.

3. The method of claim 1 wherein the disilazane is selected from the group consisting of $(H_3Si)_2NH$, $[H_2(CH_3)Si]_2NH$, $[H(CH_3)_2Si]_2NH$, $[(CH_3)_3Si]_2NH$, $[(C_2H_5)_3Si]_2NH$, $[C_6H_5)_3Si]_2NH$, $(CH_2=CH(CH_3)Si]_2NH$, $[CH_2=CH(C_6H_5)_2Si]_2NH$, $(CH_2=CH(C_2H_5)_2Si]_2NH$, and mixtures thereof.

4. The method of claim 1 wherein the mole number of compound II is at least one half that of the mole number of the total chlorine in the mixture of compounds A, B and C.

5. The method of claim 1 wherein the mole number of compound II is from about 0.7 to 1.2 times the amount of chlorine.

* * * * *